(12) United States Patent
Conger

(10) Patent No.: US 10,484,587 B2
(45) Date of Patent: Nov. 19, 2019

(54) VEHICLE CAMERA WITH CONNECTOR SYSTEM FOR HIGH SPEED TRANSMISSION

(71) Applicant: MAGNA ELECTRONICS INC., Auburn Hills, MI (US)

(72) Inventor: Jonathan D. Conger, Berkley, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/467,246

(22) Filed: Mar. 23, 2017

(65) Prior Publication Data

US 2017/0201661 A1 Jul. 13, 2017

Related U.S. Application Data

(63) Continuation-in-part of application No. 15/062,524, filed on Mar. 7, 2016.

(Continued)

(51) Int. Cl.
| | |
|---|---|
| *H04N 5/225* | (2006.01) |
| *H04N 7/18* | (2006.01) |
| *H01R 12/71* | (2011.01) |
| *H01R 13/6582* | (2011.01) |
| *H01R 9/05* | (2006.01) |
| *H01R 27/02* | (2006.01) |
| *H01R 103/00* | (2006.01) |

(Continued)

(52) U.S. Cl.
CPC ......... *H04N 5/2257* (2013.01); *H01R 9/0518* (2013.01); *H01R 12/716* (2013.01); *H01R 13/6582* (2013.01); *H01R 27/02* (2013.01); *H04N 5/2252* (2013.01); *H04N 7/18* (2013.01); *H01R 12/714* (2013.01); *H01R 13/2421* (2013.01); *H01R 13/652* (2013.01); *H01R 13/6583* (2013.01); *H01R 13/6594* (2013.01); *H01R 13/6597* (2013.01); *H01R 24/50* (2013.01); *H01R 2101/00* (2013.01); *H01R 2103/00* (2013.01); *H01R 2201/26* (2013.01)

(58) Field of Classification Search
CPC ... H04N 5/2257; H04N 5/2252; H01R 12/716
USPC .......... 348/148, 153, 139, 156, 159, 208.14, 348/825; 439/63, 581
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

*Primary Examiner* — Jefferey F Harold
*Assistant Examiner* — Jean W Desir
(74) *Attorney, Agent, or Firm* — Honigman LLP

(57) ABSTRACT

A camera for a vision system of a vehicle includes a front housing portion having a lens, a circuit board having circuitry established thereat, and a plastic rear housing portion having a connector for electrically connecting to a connector end of a wire harness of the vehicle when the camera is disposed at the vehicle. The front housing portion is mated with the rear housing portion with the circuit board disposed therein. The rear housing portion includes internal wall structure establishing internal surfaces of the rear housing portion. The connector of the rear housing portion includes a multi-pin connector having terminals for electrically connecting to circuitry at the circuit board. An electrically conductive metallic shield element is formed to be disposed within the rear housing portion and to correspond with the internal surfaces of the rear housing portion.

20 Claims, 12 Drawing Sheets

Pads on screw bosses contact exposed ground on PCB
Spring shape contacts PCB header
Pressed onto ground pins of connector

Related U.S. Application Data

(60) Provisional application No. 62/313,278, filed on Mar. 25, 2016, provisional application No. 62/217,118, filed on Sep. 11, 2015, provisional application No. 62/204,166, filed on Aug. 12, 2015, provisional application No. 62/164,619, filed on May 21, 2015, provisional application No. 62/154,396, filed on Apr. 29, 2015, provisional application No. 62/130,130, filed on Mar. 9, 2015.

(51) Int. Cl.

| | | |
|---|---|---|
| H01R 13/24 | (2006.01) | |
| H01R 13/652 | (2006.01) | |
| H01R 13/6583 | (2011.01) | |
| H01R 13/6594 | (2011.01) | |
| H01R 13/6597 | (2011.01) | |
| H01R 24/50 | (2011.01) | |
| H01R 101/00 | (2006.01) | |

(56) References Cited

U.S. PATENT DOCUMENTS

| | | |
|---|---|---|
| 5,949,331 A | 9/1999 | Schofield et al. |
| 7,965,336 B2 | 6/2011 | Bingle et al. |
| 8,503,061 B2 | 8/2013 | Uken et al. |
| 8,542,451 B2 | 9/2013 | Lu et al. |
| 8,866,907 B2 | 10/2014 | McElroy et al. |
| 9,041,806 B2 | 5/2015 | Baur et al. |
| 9,126,525 B2 | 9/2015 | Lynam et al. |
| 9,233,641 B2 | 1/2016 | Sesti et al. |
| 9,565,342 B2* | 2/2017 | Sauer ............... H04N 5/2257 |
| 9,609,757 B2 | 3/2017 | Stegerwald |
| 10,128,595 B2* | 11/2018 | Conger ............... H01R 12/716 |
| 2011/0310248 A1 | 12/2011 | McElroy et al. |
| 2012/0218412 A1 | 8/2012 | Dellantoni et al. |
| 2013/0222595 A1 | 8/2013 | Gebauer et al. |
| 2013/0242099 A1* | 9/2013 | Sauer ............... H04N 5/2257 |
| | | 348/148 |
| 2013/0328672 A1 | 12/2013 | Sesti et al. |
| 2013/0344736 A1 | 12/2013 | Latunski |
| 2014/0138140 A1 | 5/2014 | Sigle |
| 2014/0218535 A1 | 8/2014 | Ihlenburg et al. |
| 2014/0320636 A1 | 10/2014 | Bally et al. |
| 2014/0340510 A1 | 11/2014 | Ihlenburg et al. |
| 2014/0362209 A1 | 12/2014 | Ziegenspeck et al. |
| 2014/0373345 A1 | 12/2014 | Steigerwald |
| 2015/0042807 A1 | 2/2015 | Ihlenburg et al. |
| 2015/0222795 A1 | 8/2015 | Sauer et al. |
| 2015/0266430 A1 | 9/2015 | Mleczko et al. |
| 2015/0365569 A1 | 12/2015 | Mai et al. |
| 2016/0037028 A1 | 2/2016 | Biemer |
| 2016/0268716 A1 | 9/2016 | Conger et al. |
| 2017/0054881 A1 | 2/2017 | Conger et al. |
| 2017/0133811 A1 | 5/2017 | Conger et al. |
| 2017/0295306 A1 | 10/2017 | Mleczko et al. |
| 2017/0302829 A1 | 10/2017 | Mleczko et al. |

* cited by examiner

Prior Art Œ Coaxial Header and Jack

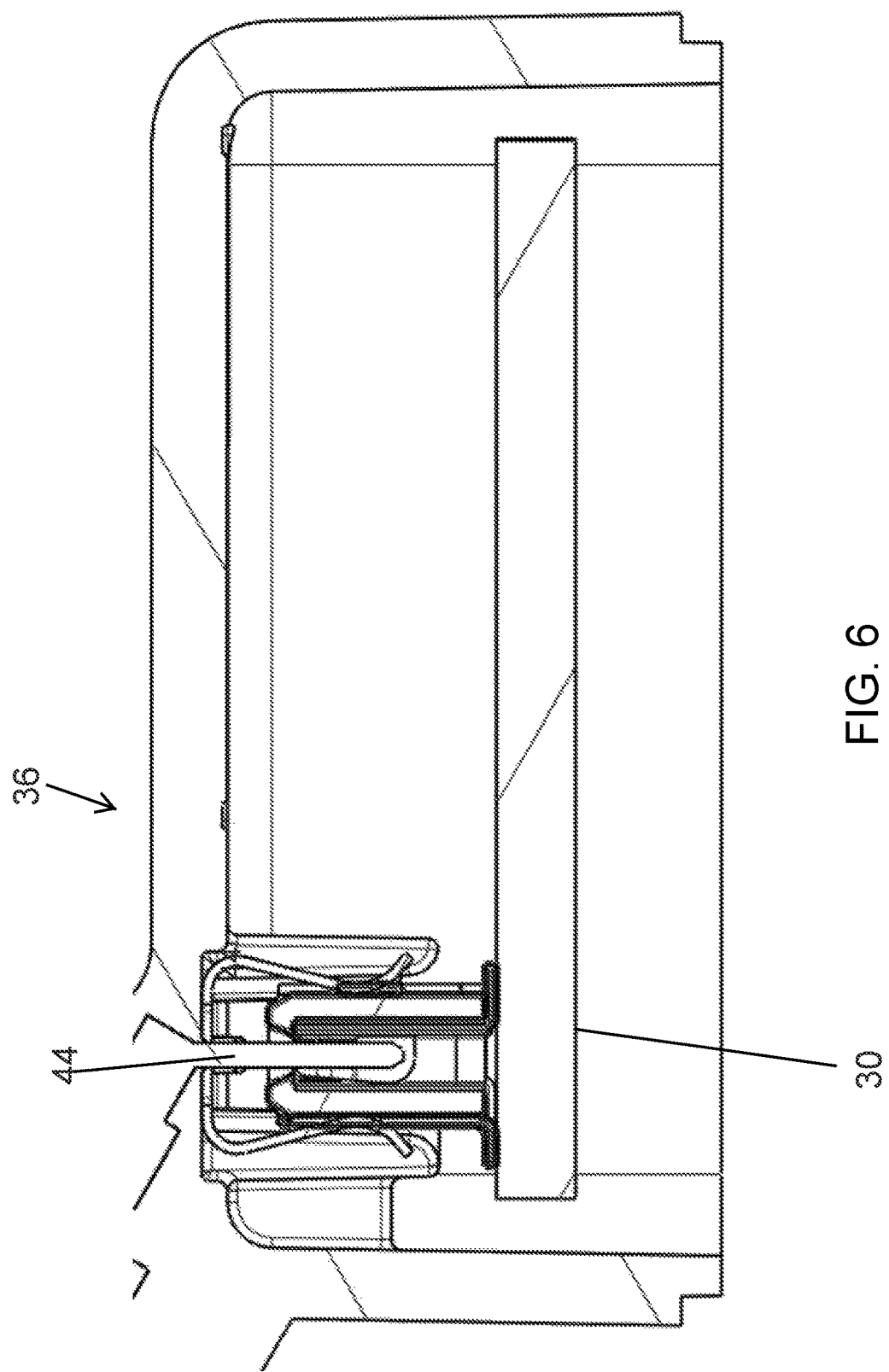

Folded State

Flat State

US 10,484,587 B2

VEHICLE CAMERA WITH CONNECTOR SYSTEM FOR HIGH SPEED TRANSMISSION

CROSS REFERENCE TO RELATED APPLICATIONS

The present application claims the filing benefits of U.S. provisional application, Ser. No. 62/313,278, filed Mar. 25, 2016, which is hereby incorporated herein by reference in its entirety. The present application also is a continuation-in-part of U.S. patent application Ser. No. 15/062,524, filed Mar. 7, 2016, now U.S. Pat. No. 10,128,595, which claims the filing benefits of U.S. provisional applications, Ser. No. 62/217,118, filed Sep. 11, 2015; Ser. No. 62/204,166, filed Aug. 12, 2015; Ser. No. 62/164,619, filed May 21, 2015, Ser. No. 62/154,396, filed Apr. 29, 2015, and Ser. No. 62/130,130, filed Mar. 9, 2015, which are all hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. In high speed digital data transmission in automotive applications, such as sensors or displays or infotainment systems, shielded coaxial cable is used for its excellent isolation of the signal and ground path from each other, and from electromagnetic interference (EMI) issues with adjacent electrical components. The device's PCB typically contains a coaxial header as shown in FIG. 1, and the device's housing would have a mating jack to engage this header. This method of connection to the PCB requires intricate machining, casting, or stamping operations which increase cost and reduce design flexibility.

SUMMARY OF THE INVENTION

The present invention provides a vision system or imaging system for a vehicle that utilizes one or more cameras (preferably one or more CMOS cameras) to capture image data representative of images exterior of the vehicle, and provides enhanced electrical connection between a coaxial connector and circuitry of a printed circuit board of the camera. The connection of the present invention provides a ground clamp that clamps to ground pins of the connector portion of the housing of the camera and that clamps to a ground shield at the header of the printed circuit board when the camera is assembled. The connection thus provides enhanced grounding and enhanced electrical connection of the connector portion to the PCB circuitry, thereby providing enhanced data transmission, such as for high speed data transmission applications.

According to an aspect of the present invention, a camera for a vision system of a vehicle includes a front housing portion having a lens barrel or lens holder and a rear housing portion having a connector for connecting to a coaxial vehicle wire harness when the camera is disposed at the vehicle. The connector comprises a signal pin and at least one ground pin or contact (such as two ground pins or contacts, one at each side of the signal pin). The rear housing portion includes a clamping element in electrically conductive connection with the ground pins and electrically isolated from the signal pin. The camera includes a circuit element (such as a printed circuit board or PCB at the front housing portion) having circuitry established thereat. The circuit element comprises a connector header and an electrically conductive shield disposed at least partially around the connector header and in electrical connection with circuitry of the circuit element (such as via soldering of the connector header at circuitry or traces of the circuit element). The clamping element is configured to engage the electrically conductive shield when the signal pin and the ground pins engage the connector header during assembly of the camera, and wherein connection of the clamping element and the electrically conductive shield provides enhanced grounding of the ground pins of the connector with circuitry of the circuit element.

These and other objects, advantages, purposes and features of the present invention will become apparent upon review of the following specification in conjunction with the drawings.

BRIEF DESCRIPTION OF THE DRAWINGS

FIG. 6 is a sectional view of the rear housing portion, showing the electrical connection being made between the pins and the header portion and between the spring clamp and the metal shield in accordance with the present invention;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
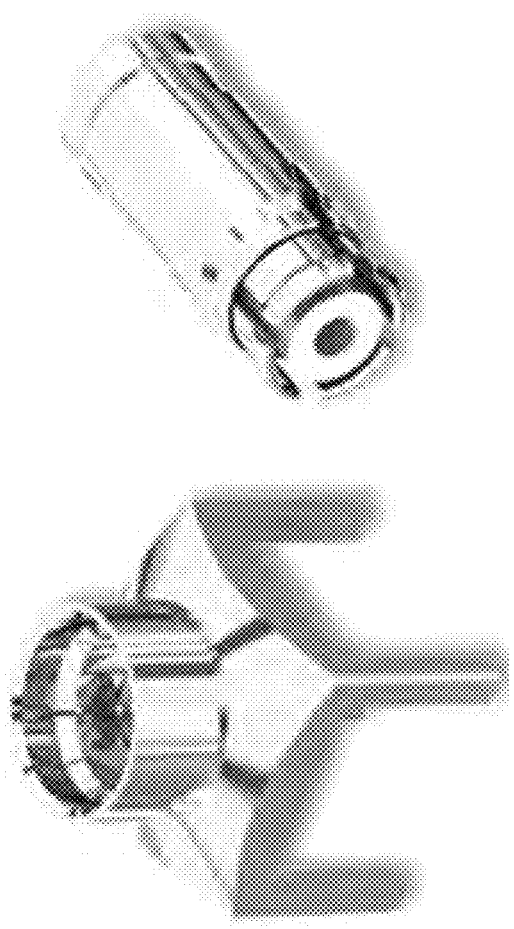
FIG. 1 is a prior art coaxial connector.
Figure 2:
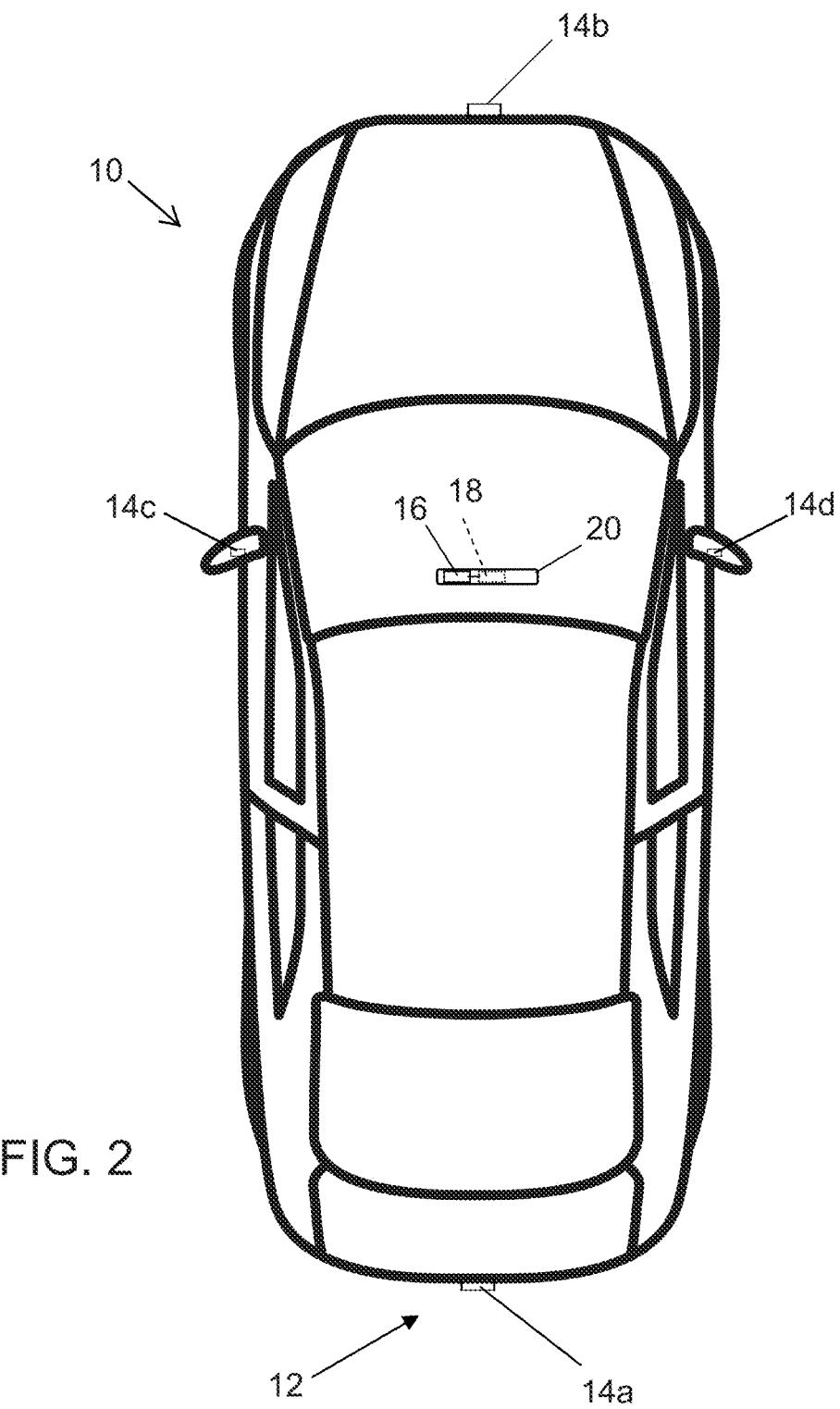
FIG. 2 is a plan view of a vehicle with a vision system that incorporates cameras in accordance with the present invention.
Figure 2A:
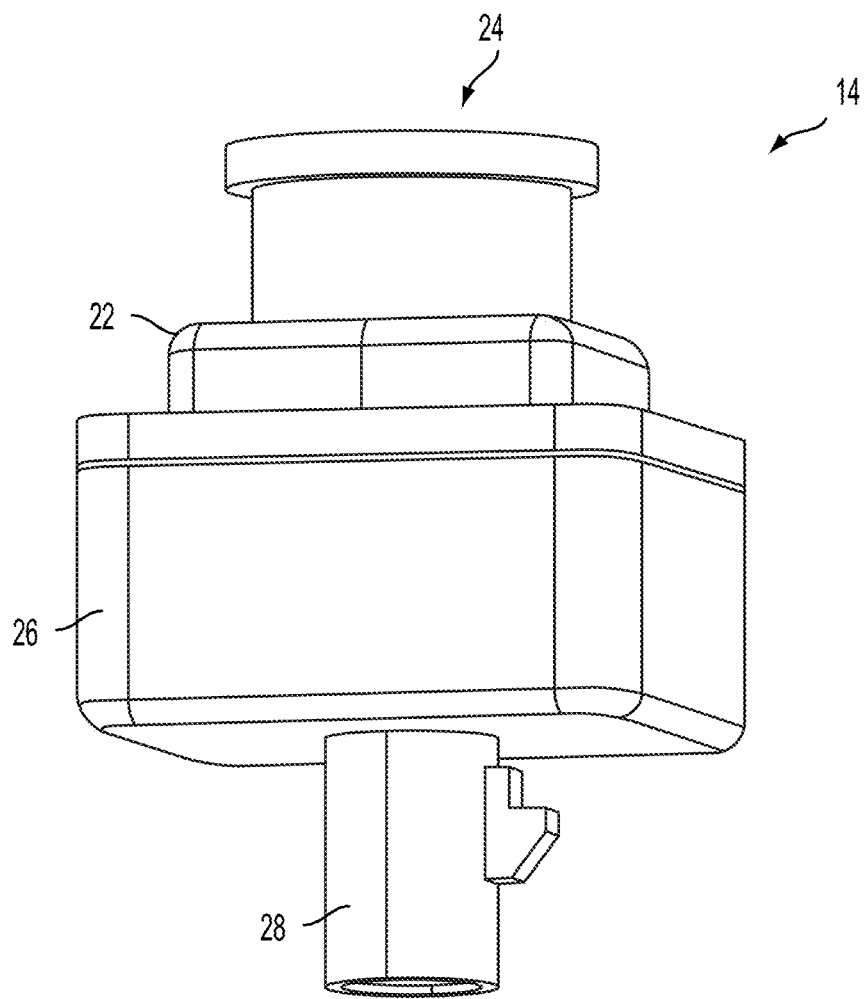
FIG. 2A is a perspective view of a camera in accordance with the present invention.

Referring now to the drawings and the illustrative embodiments depicted therein, a vehicle 10 includes an imaging system or vision system 12 that includes at least one exterior facing imaging sensor or camera, such as a rearward viewing imaging sensor or camera 14a (and the system may optionally include multiple exterior facing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 2). The vision system 12 includes a control or electronic control unit (ECU) or processor 18 that is operable to process image data captured by the cameras and may provide displayed images at a display device 16 for viewing by the driver of the vehicle (although shown in FIG. 2 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle. As shown in FIG. 2A, the camera 14 includes a first or front housing portion 22 that includes a lens or lens assembly 24, and further includes a second or rear housing portion 26 that has a connector portion 28 for electrically connecting to or receiving one or more connecting ends of wires of the vehicle when the camera is disposed at a vehicle, as discussed below.

In accordance with the present invention, the data transfer is made via a coaxial connection to circuitry of the camera or control. Low speed analog transmissions may be handled by discrete wires which are routed to individual pin headers (such as by utilizing aspects of the systems described in U.S. Publication No. US-2013-0328672, which is hereby incorporated herein by reference in its entirety). These pin headers are commonly available, and may be manufactured with simple low cost components. When attempting to transmit digital signals through this type of header, the transmission may be compromised due to EMI or RF Leakage.

The present invention outfits an analog style connector system with novel features to achieve performance on-par with the more expensive coaxial connectors in high speed digital data applications. The connection of the present invention may electrically connect a coaxial wiring connector to a printed circuit board of a device, such as a camera of a vehicle vision system. The connection and camera may utilize aspects of the connections and cameras described in U.S. Pat. No. 8,866,907 and/or U.S. Publication Nos. US-2013-0328672; US-2014-0320636; US-2013-0222595; US-2013-0344736; US-2014-0373345 US-2013-0242099; US-2015-0222795 and/or US-2016-0268716, which are all hereby incorporated herein by reference in their entireties.

Figure 3:
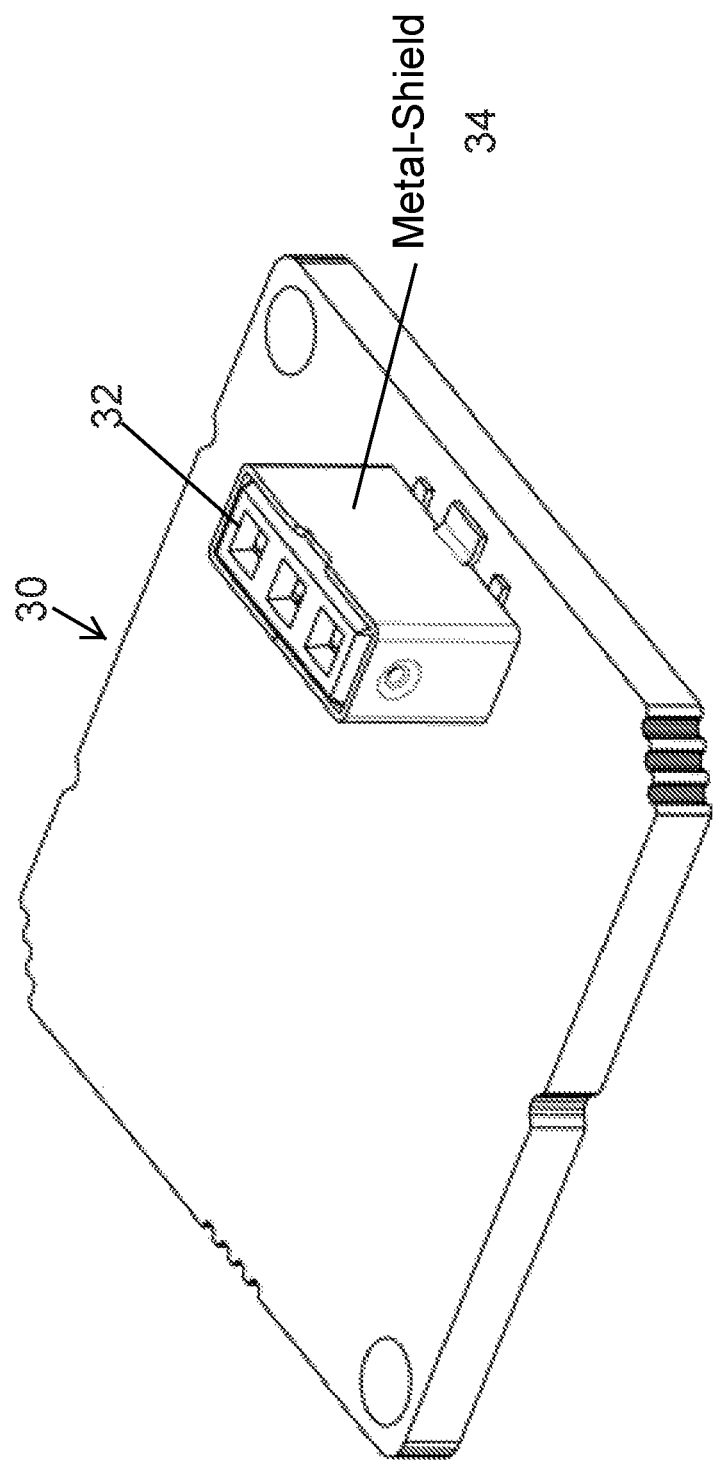
FIG. 3 is a perspective view of a printed circuit board of a device, shown with a metal shield at and at least partially around a header connector in accordance with the present invention.

As shown in FIG. 3, a printed circuit board (PCB) 30 includes an analog header 32 surrounded by a metal header shield 34 that is soldered to the PCB. The metal shield is designed to retain to the header such that the two can be placed in one pick-and-place step in the SMT (surface-mount technology) process as used for stuffing components onto a circuit board during manufacture of electrical circuitry. This component would be made of any conductive material, and may or may not be plated. The printed circuit board includes circuitry of the device, and may include circuitry on both sides of the board or substrate, such as imager circuitry of a camera, where the PCB may be disposed in a camera housing, with a front camera housing including a lens support or barrel and a rear camera housing portion having an electrical connector for connecting to a vehicle wiring harness. The circuit board or boards may be attached at the front or rear housing, and when the camera is assembled together, the connector at the rear camera housing portion makes electrical connection to circuitry or connectors at the rear surface of a rear circuit board of the camera. The circuit board includes circuitry associated with the imager or imaging array, and the circuit board at the connector may be electrically connected (such as via a flexible connector or ribbon cable or the like) to a second or stacked circuit board of the camera, with the second circuit board including the imager or imaging array of the camera or camera module.

Figure 4:
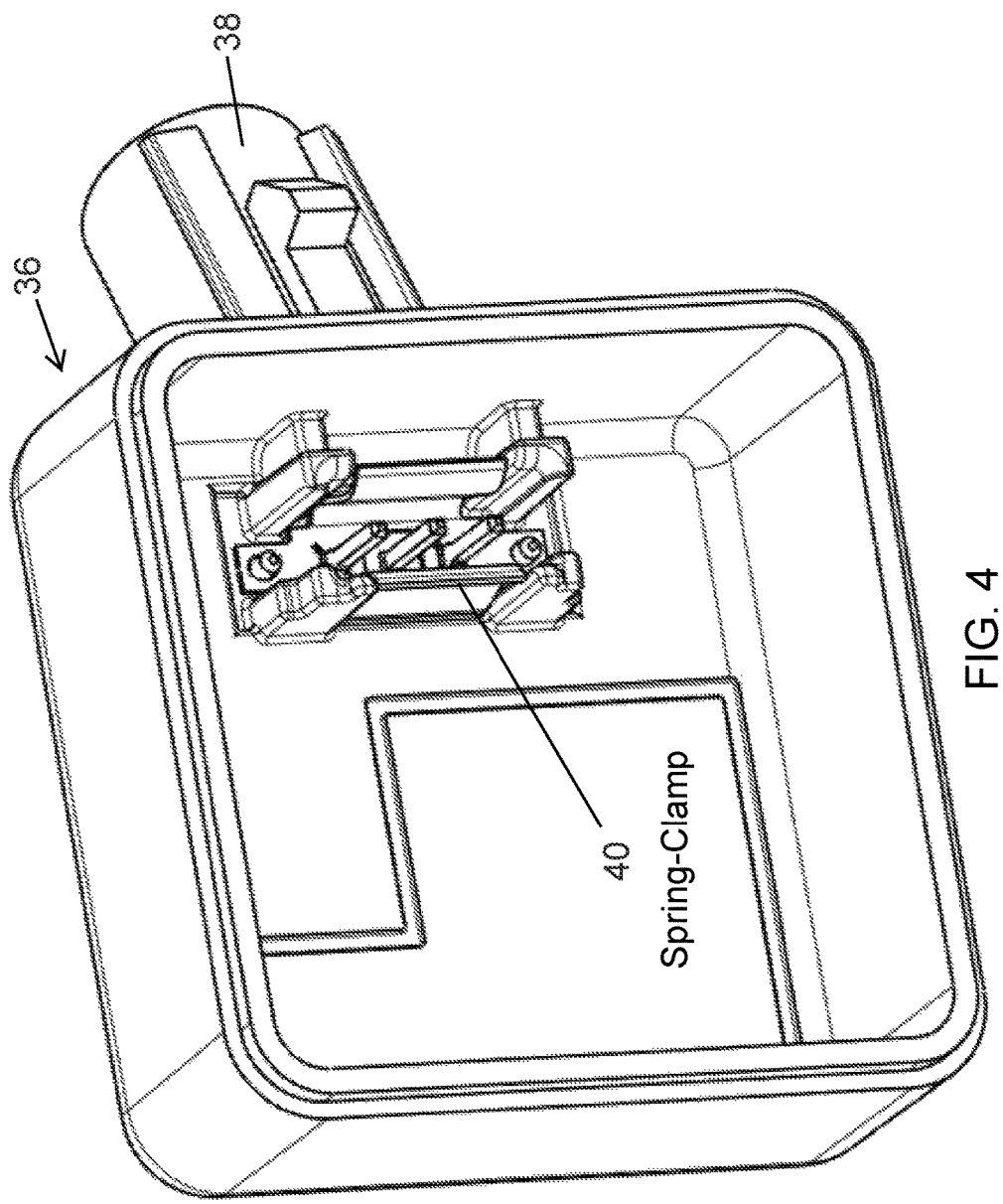
FIG. 4 is a perspective view of a rear housing portion of a device, such as a camera, shown with a spring clamp at the ground pins of the electrical connector of the housing portion in accordance with the present invention.
Figure 5:
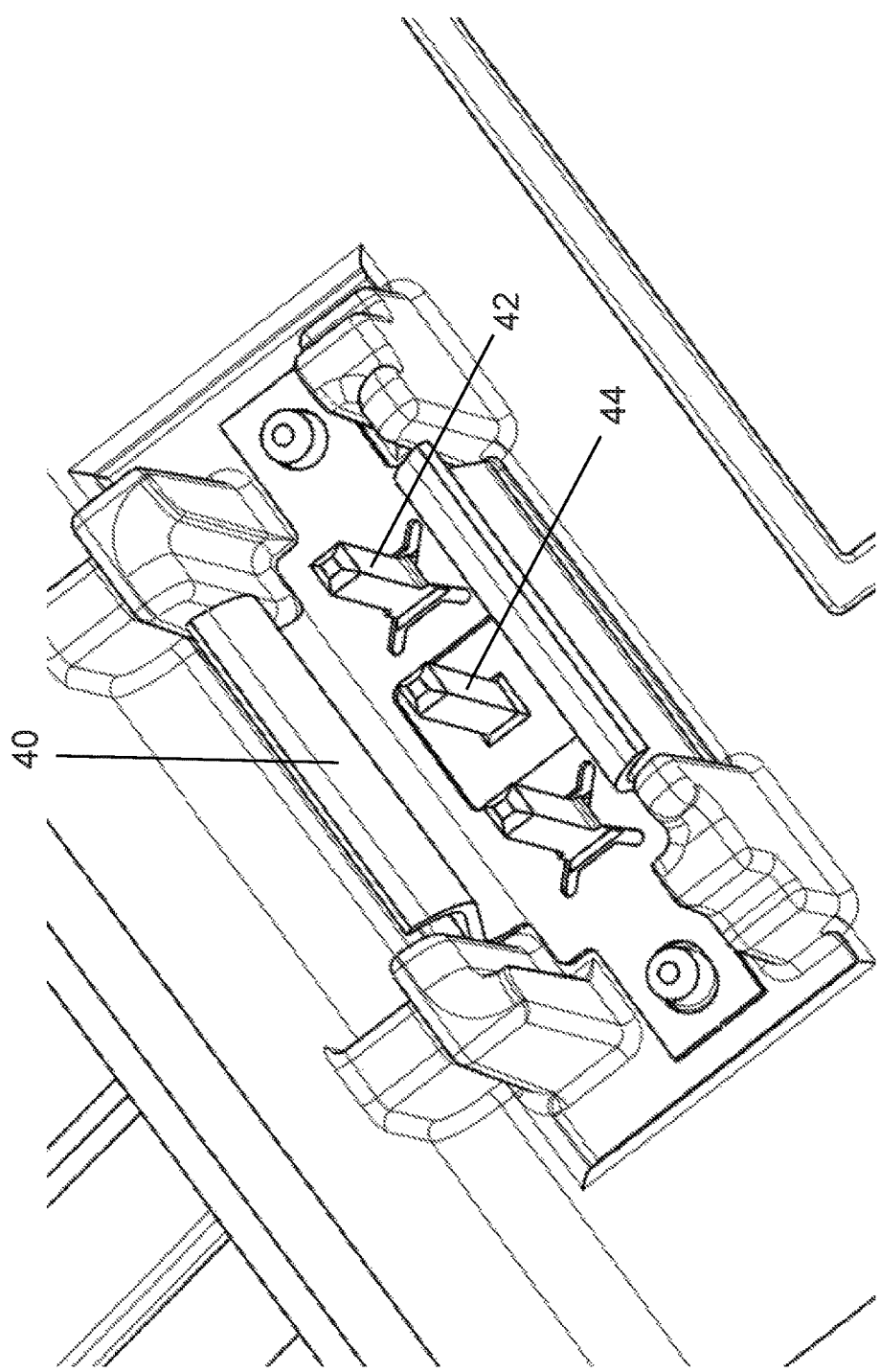
FIG. 5 is an enlarged perspective view of the spring clamp and connector pins of the rear housing portion of FIG. 4.

As shown in FIGS. 4 and 5, the rear camera housing portion 36 includes a connecting portion 38 for connecting to a vehicle wiring harness or the like. The rear camera housing portion 36 may comprise a plastic or polymeric housing portion molded via an injection molding operation from a polymeric material or resin that is non-electrically conducting. The rear housing portion receives the circuit board 30 therein, where terminals of the connecting portion electrically conductively connect with circuitry at the circuit board (such as via the header connector at the circuit board). In the illustrated embodiment, the terminals of the connecting portion include ground pins 42 and a video signal pin 44 that protrude from the connecting portion so as to be received in respective receptacles of a header connector 32 at the circuit board 30 when the circuit board is attached at the rear housing portion.

Figure 6A:
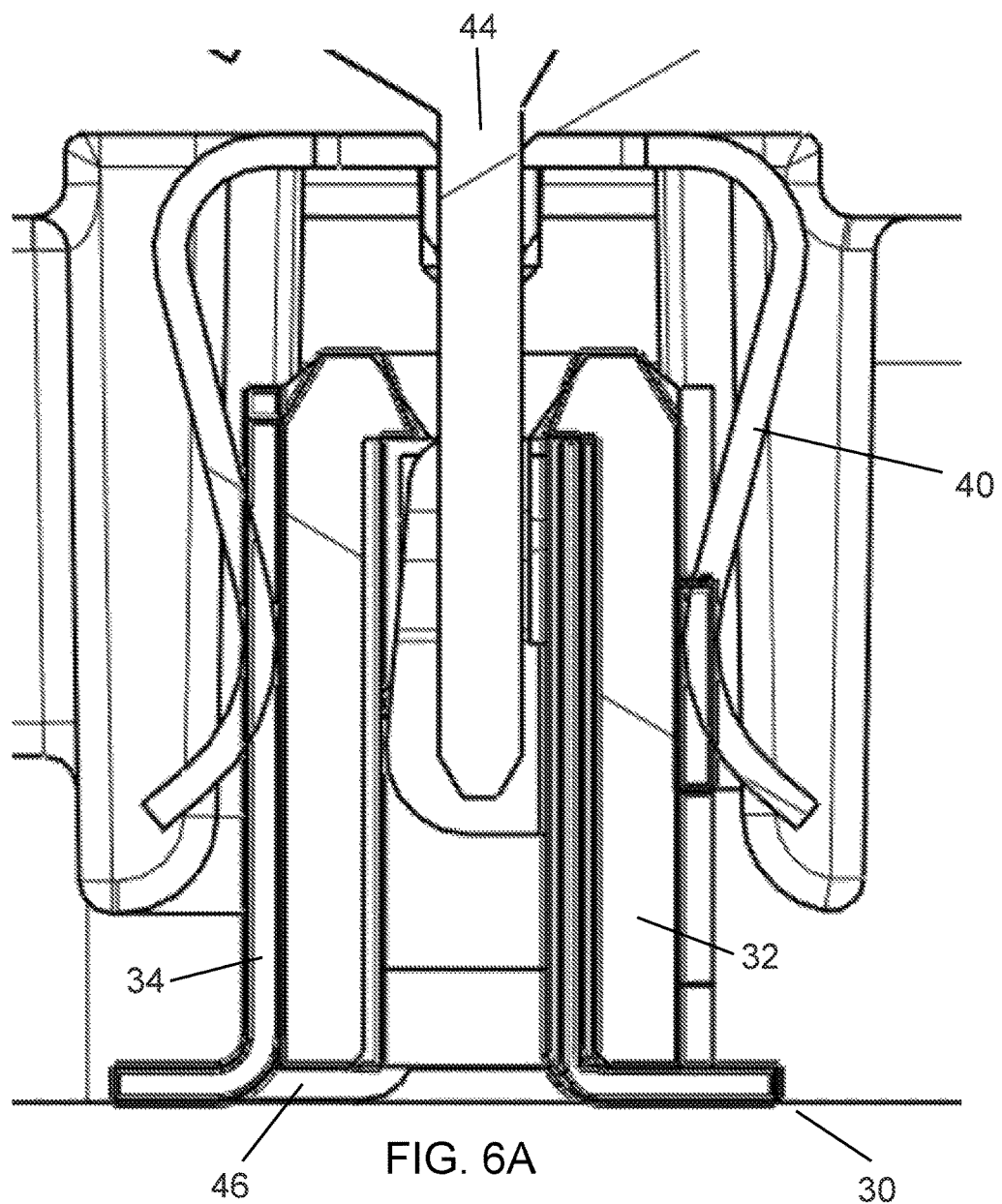
FIG. 6A is an enlarged view of the area A in FIG. 6.

A spring shield or clamp 40 is disposed at the rear camera housing portion 36 and comprises a series of clamp features which engage (so as to electrically conductively connect with) the ground pins 42 of the connector of the device, and includes a center hole to avoid the signal pin 44. The spring shield 40 includes clamp features which, when the connector is connected to the header 32 of the PCB 30 (such as shown in FIGS. 6 and 6A), bear against the header shield 34 to create a continuous ground path to the PCB, to shield the center pin 44 in all relative positions of the PCB and housing, and to protect against external EMI. Thus, when the spring shield and connector are pressed into engagement with the PCB header (such as when the PCB is attached at the rear housing portion, such as via one or more fasteners or the like), the pins 42, 44 are received in their respective receivers of the header (such as shown in FIG. 6A, where the signal pin 44 is received in and electrically connects to a receiving portion 46 of the header 32) while the spring shield 40 engages and clamps onto and electrically conductively connects to the header shield 34 at the circuit board 30.

The pin clamps are designed such that the shield can be applied at the rear housing portion and at the ground pins 42 with a press, but provides a high retention force. The clamps that engage the header shield 34 are shaped such that they guide the header into position before the three pins 42, 44 engage the respective parts or receivers of the header 32 at the PCB 30. For example, and such as shown in FIGS. 6 and 6A, the walls of the spring shield 40 are flared or curved outwardly such that any misalignment between the spring shield and the header shield during connection of the parts is accommodated by flexing and guiding of the spring shield walls as the spring shield and header shield are pressed together. The spring shield 40 may be made of any electrically conductive spring material, such as, for example, and not limited to, beryllium copper, phosphor bronze and/or stainless spring steel. Optionally, the spring shield may or may not be plated.

Therefore, the present invention provides a connector with enhanced ground connection between the connector at the rear housing portion and the circuitry at the PCB of the camera or device. The spring clamp is electrically conductively connected to the ground pins of the connector and is configured to flex and clamp onto an electrically conductive shield at and around the header at the PCB when the electrical connector is connected or plugged into the PCB header (such as during assembly of the camera or device). The spring clamp and header shield of the present invention thus provide enhanced electrically conductive connection or ground connection to the circuitry of the PCB, while easing alignment and assembly of the connector to the PCB header during assembly of the camera or device.

Thus, the clamping element may comprise a metallic element that is press fit attached to the ground pins. The clamping element may comprise any suitable number of flexible walls (such as, for example, four flexible walls) that are biased towards a position where the flexible walls engage and clamp onto the electrically conductive shield when the camera is assembled. The flexible walls are preferably configured to guide or align the clamping element with the electrically conductive shield during assembly of the camera.

The present invention provides the combination of a high speed data header shield with a full enclosure shield as one piece or housing portion. The added function protects against radiated or conducted EMI emissions. These emissions may come from the outside and affect the circuit board chips, or the chips may radiate interference to devices outside the camera.

Figure 7:
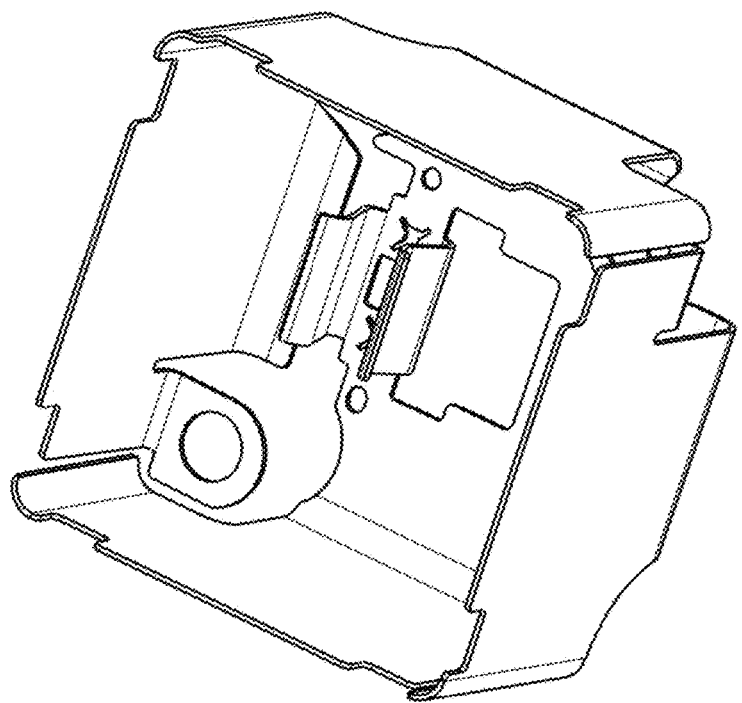
FIG. 7 is a perspective view of a full enclosure shield for disposing in the rear camera housing to enhance grounding and enhance distribution of heat within the housing.
Figure 8:
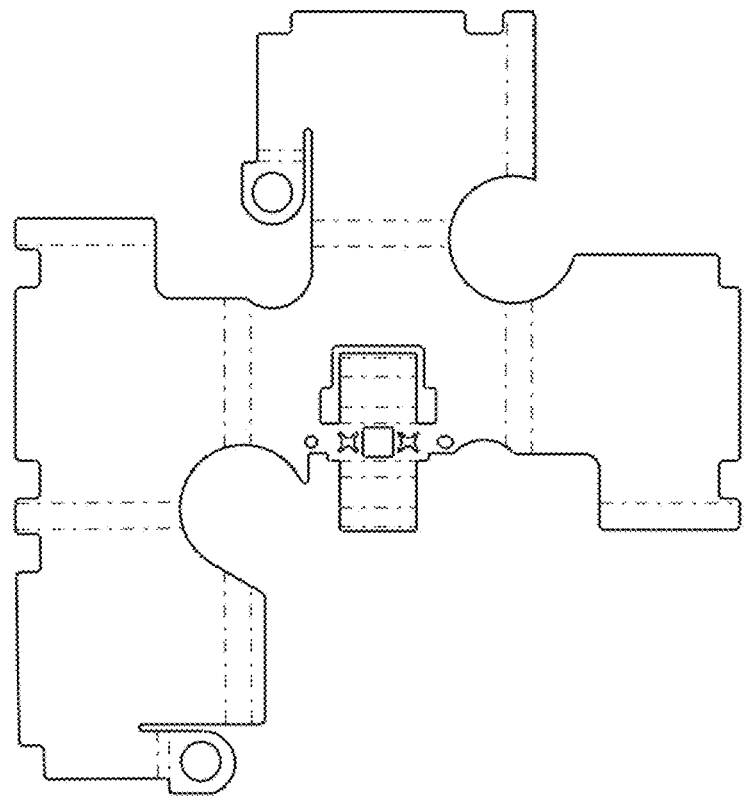
FIG. 8 is a plan view showing the enclosure shield in its unfolded state.
Figure 9:
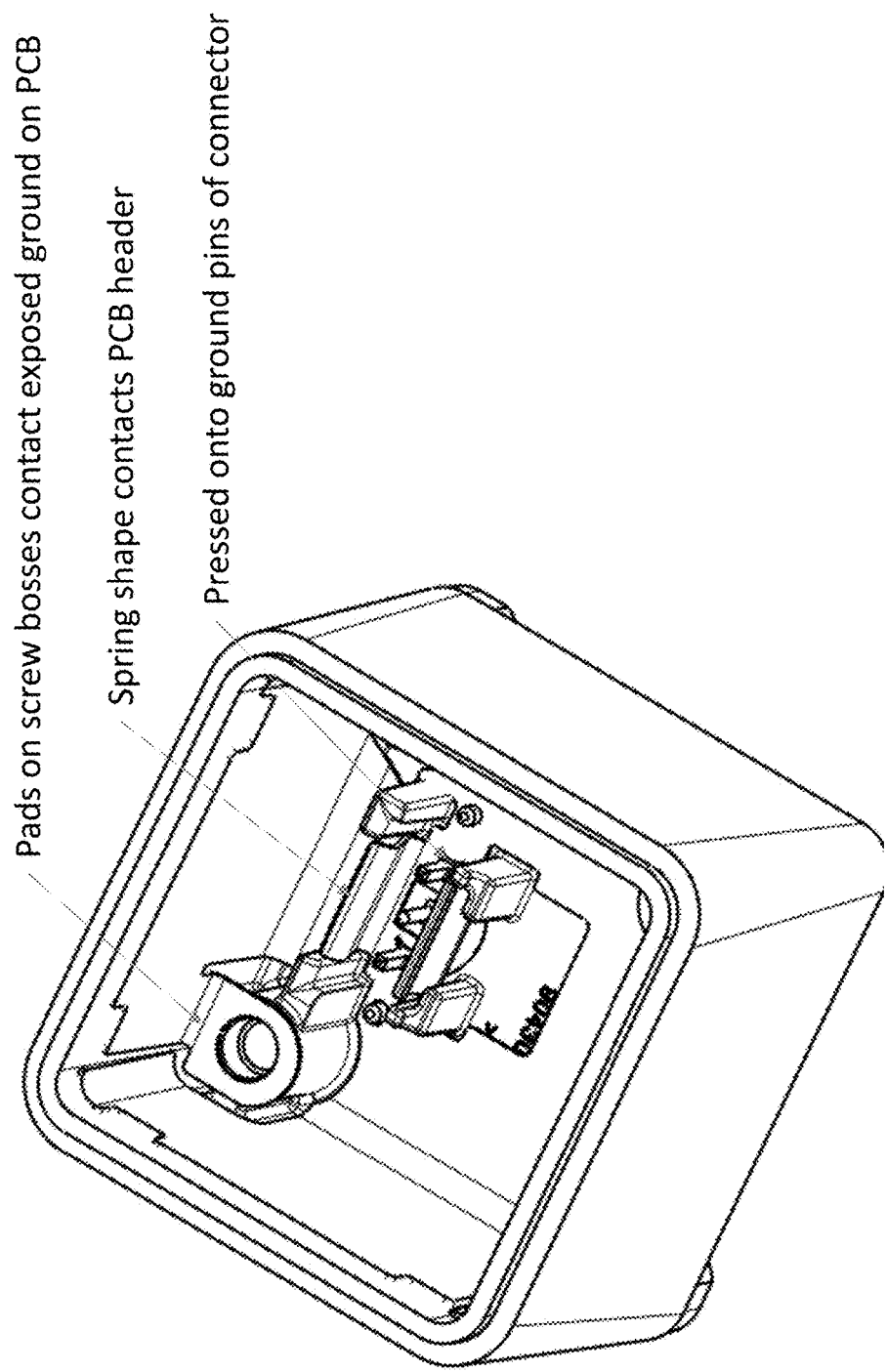
FIG. 9 is a perspective view of a rear camera housing of the present invention, with the enclosure shield disposed therein.
Figure 11:
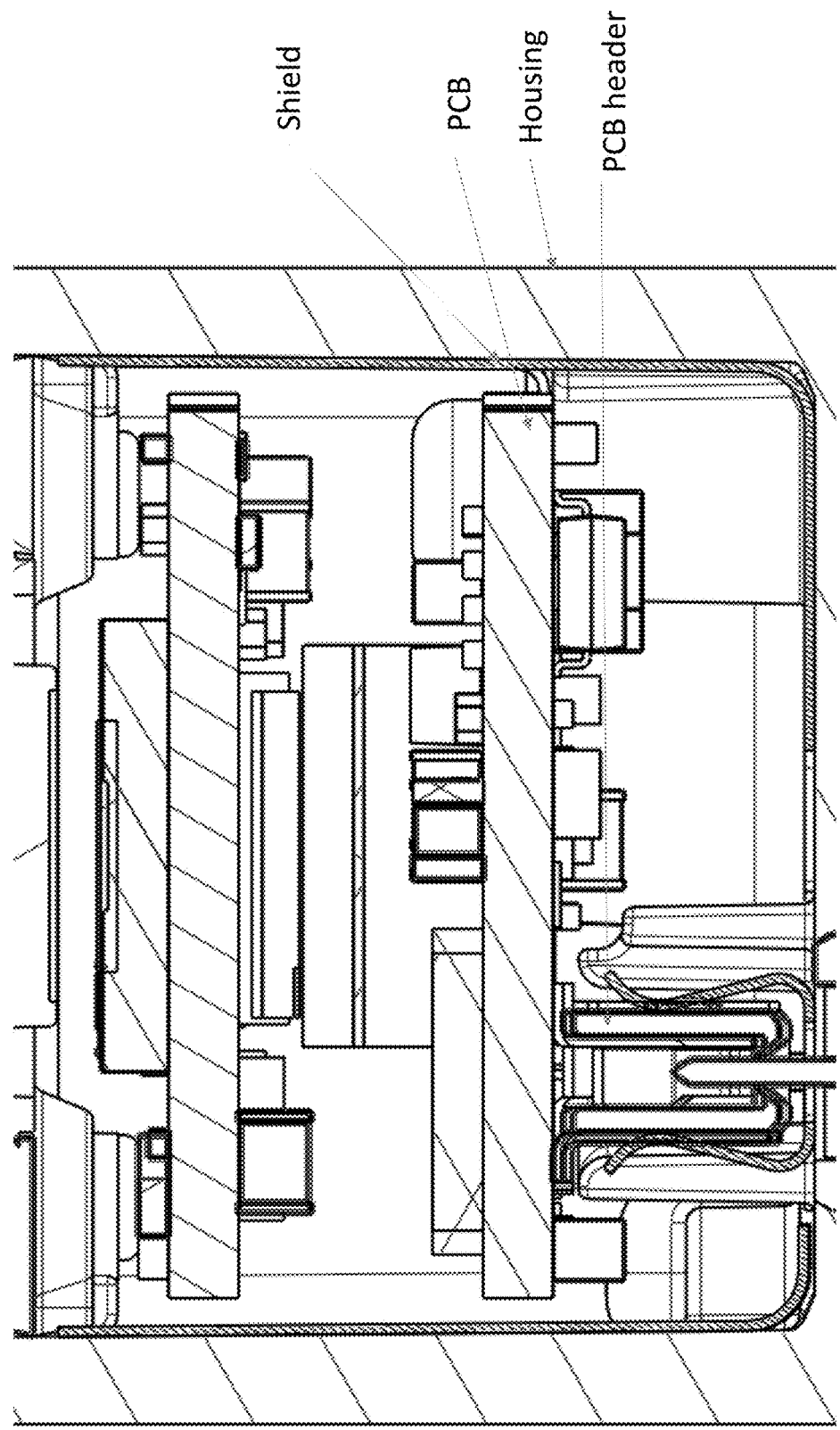
FIG. 11 is a sectional view of the camera, showing the shield and housing assembly of the present invention.

As shown in FIGS. 7-9, the shield element may comprise a flat or unfolded state (FIG. 8) and may be folded to its use or implementation state (FIG. 7), whereby the shield may be inserted into the rear camera housing such that the connector portions may protrude through apertures formed in the shield. As can be seen in FIGS. 7 and 8, the spring shield or clamping shield element may be formed as part of the shield element. As shown in FIGS. 9 and 11, when the shield is disposed in the rear camera housing, the connector portions at the rear housing may protrude through the respective apertures and the clamping shield element is disposed at the connector region for electrically connecting or grounding with electrical connector elements of the PCB header. The openings through the shield element that receive the terminals are formed such that the shield element engages and bites into or presses against the ground connect pin or terminal and such that the shield element is spaced from the video pin or terminal.

Figure 10:
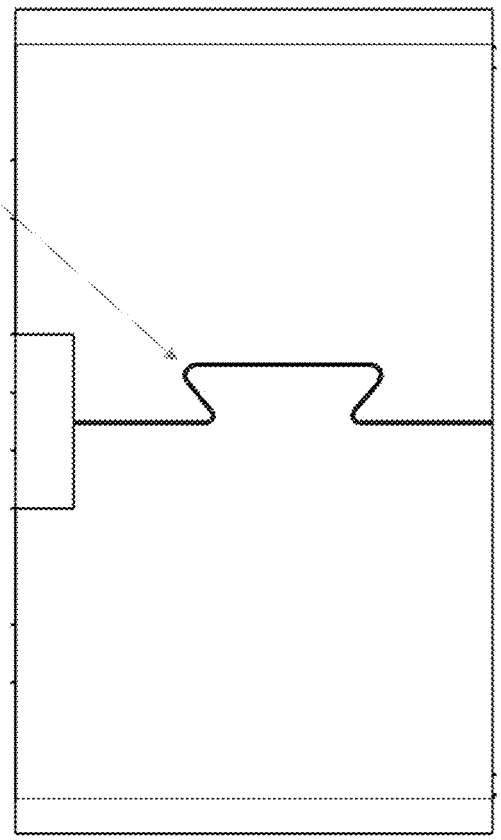
FIG. 10 is a side elevation of the enclosure shield, showing interlocking elements for reducing gaps in the shield when the shield is disposed within the rear camera housing.

The shield has a robust grounding scheme by contacting the shield of the PCB header and the exposed ground pads on the PCB where it contacts the screw bosses. Reducing seams and voids is important, so these gaps can be closed by interlocking the stamping to itself (see FIG. 10), or by welding. As can be seen with reference to FIGS. 7 and 8, the flat or unfolded or stamped shield element (FIG. 8) is folded to its folded state, whereby flanges or lips of adjacent corner regions of the shield element may overlap to provide a closed shield element to limit EMI waves from passing through the shield element. Also, the shield could be formed as a deep draw stamping to eliminate all gaps.

In the illustrated embodiment, the shield is intended to be assembled into the housing, but optionally the shield may be insert molded and could also be placed into the tool during the molding of the housing. In such an insert molded application, it may be advantageous to have holes or slots strategically placed in the stamping to allow the molded plastic housing material (molded via an injection molding process) to flow through or around the stamping during the molding process to help with retention of the metal insert within the housing. The holes would be sized such that EMI waves of the size of concern would be attenuated or could not pass through.

An additional benefit of the shield of the present invention is improved distribution of heat when combined with a thermal median such as a conductive pad or paste. The stamping would pull heat away from high power components, reducing their steady state operating temperature and improving performance. Optionally, a conductive polymer may be used to improve heat distribution further.

The shield of the present invention offers a cost savings as compared to a housing made as a die casting, or as compared to a plastic housing coated in metal with a process such as vapor deposition. The shield may be made of any metal, but Phosphor Bronze, Cartridge Brass, or Beryllium Copper would be common choices. The shield may or may not be plated.

Optionally, the camera is configured to electrically connect to a coaxial cable connector. Such coaxial cables fulfill various functions, such as for an Ethernet connection. Transmission of video data over coaxial cabling and utilizing the connectors of the present invention has several advantages, including enhanced protection against hacking or corruption due to cyber-attacks and the like on a vehicle equipped with the vehicle cameras and connection system of the present invention. For example, in a surround vision system comprising at least three vehicle cameras, it is preferred to use Ethernet cabling and the connection system of the present invention for transmission of image data captured by the respective video cameras of a vehicular multi-camera surround vision system to a central ECU where video manipulation and image stitching can be performed to generate a composite bird's eye or top view or panoramic view image for display to a driver of the equipped vehicle. Ethernet equipped vision systems that benefit from the vehicle cameras and connecting system of the present invention include systems of the types described in U.S. Pat. Nos. 9,126,525; 9,041,806 and/or U.S. Publication Nos. US-2015-0042807; US-2014-0340510; US-2014-0218535 and/or US-2012-0218412 which are hereby incorporated herein by reference in their entireties.

Optionally, the coaxial cable structure with flexible pin and shielding-crimp ferule of the present invention may be paired with different connector types, such as connectors having a single pin, such as shown in FIGS. 3-6A, or multiple pins having a common circumferential shielding or one shielding each. For example, the rear camera housing may include a connector portion that has a cylindrical portion through which a flexible end or pin of the coaxial connector may extend, and the connector portion also includes a multi-pin connector portion that receives the pins or terminals of a multi-pin connector (such as described above), which may then electrically connect to terminals and circuitry at the circuit board. The flexible pin of the coaxial cable connector and the terminals of the multi-pin connector may connect to circuitry elements at the PCB during assembly of the camera, such as discussed above. The shield of the single pins may optionally be done by metallization of the camera rear housing inner wall next to the to-be-shielded pin.

Thus, the connector or connectors of the rear housing portion may be molded with the housing portion and includes a multi-pin connector portion and a coaxial connector portion (with the terminals insert molded with the connector during the molding process that forms the rear housing portion). The multi-pin connector portion receives multi-pin connector terminals therein, and the terminals (which may be pins or receiving elements for receiving pins) engage corresponding terminals (such as receiving elements or pins or circuitry elements) at the circuit board when the circuit board is moved into engagement with the terminals. The circuit board may include a header shield and the connector portion may include a spring shield or clamp that, when the connector is connected to the header shield of the PCB, bear against the header shield to create a continuous ground path to the PCB, to shield the center pin in all relative positions of the PCB and housing, and to protect against external EMI, such as discussed above. The connectors (including the multi-pin connector portion and the coaxial connector portion) may be formed adjacent to one another or as part of a single connector, or may be formed separate from one another as separate and distinct connectors of the camera housing.

The coaxial connector portion receives a coaxial connector therein, with an extended core pin of the coaxial connector extending to contact a circuit element at the circuit board, and with the crimped ferule of the coaxial connector being press fit or interference fit within the coaxial connector portion. The inner surface of the coaxial connector portion may be metalized or otherwise electrically conductive, with that metalized surface being in electrical connection with a circuit element at the circuit board when the camera is assembled together. Optionally, and desirably, due to the extended length of the core pin from the ferule, a dielectric element may be disposed along the core pin and within the coaxial connector portion to limit lateral flexing of the core pin and shorting of the core pin at the electrically conductive or metalized inner surface during assembly of the camera and during use over the lifetime of the camera at a vehicle. The core pin may comprise a spring-loaded core pin to enhance electrical contact and connection at the circuit element of the circuit board when the camera is assembled.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The camera may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028; US-2016-0268716 and/or US-2017-0054881, and/or U.S. patent application Ser. No. 15/341,048, filed Nov. 2, 2016, now U.S. Pat. No. 10,250,004, and/or U.S. provisional applications, Ser. No. 62/319, 953, filed Apr. 8, 2016, and/or Ser. No. 62/322,334, filed Apr. 14, 2016, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera for a vision system of a vehicle, said camera comprising:
   a front housing portion comprising a lens;
   a circuit board having circuitry established thereat, wherein said circuitry is associated with an imager of said camera;
   a plastic rear housing portion having a connector for electrically connecting to a connector end of a wire harness of the vehicle when said camera is disposed at the vehicle;
   wherein said rear housing portion comprises internal wall structure establishing internal wall surfaces of said rear housing portion;
   wherein said connector of said rear housing portion comprises a multi-pin connector having terminals that electrically connect to circuitry at said circuit board; and
   an electrically conductive metallic shield element disposed within said rear housing portion and corresponding with said internal wall surfaces of said rear housing portion.

2. The camera of claim 1, wherein said front housing portion is mated with said rear housing portion with said circuit board disposed therein.

3. The camera of claim 1, wherein said shield element is formed from a flat metallic element.

4. The camera of claim 3, wherein the flat metallic element is folded to form said shield element so that said shield element corresponds with said internal wall surfaces of said rear housing portion.

5. The camera of claim 1, wherein said plastic rear housing portion is formed by plastic injection molding, and wherein said shield element is insert molded at said internal wall surfaces of said rear housing portion during the molding of said rear housing portion.

6. The camera of claim 1, wherein said plastic rear housing portion is formed by plastic injection molding, and wherein said multi-pin connector is insert molded in said rear housing portion during the molding of said rear housing portion.

7. The camera of claim 1, wherein said terminals of said multi-pin connector comprise a video signal terminal and at least one ground-connect terminal.

8. The camera of claim 7, wherein said shield element includes a clamping element in electrically conductive connection with said at least one ground-connect terminal and electrically isolated from said video signal terminal.

9. The camera of claim 8, wherein said clamping element is press fit attached to said at least one ground-connect terminal.

10. The camera of claim 8, wherein said circuit board comprises a header connector that electrically connects with said terminals of said multi-pin connector, and wherein said clamping element comprises a plurality of flexible walls that are biased towards a position where said flexible walls engage and clamp onto said header connector of said circuit board.

11. The camera of claim 1, wherein said circuit board comprises a header connector that electrically connects with said terminals of said multi-pin connector.

12. The camera of claim 11, wherein said shield element includes a clamping element that receives said header connector therein, and wherein said clamping element comprises flexible walls that are biased towards a position where said flexible walls engage and clamp onto said header connector of said circuit board.

13. The camera of claim 1, wherein said circuit board is attached at said rear housing portion so as to hold said terminals of said multi-pin connector engaged with circuitry of said circuit board.

14. The camera of claim 13, wherein said circuit board is attached at said rear housing portion via at least one fastener, and wherein said shield element comprises a portion that engages the fastener and a ground element of said circuit board.

15. A camera for a vision system of a vehicle, said camera comprising:
   a front housing portion comprising a lens;

a circuit board having circuitry established thereat, wherein said circuitry is associated with an imager of said camera;

a plastic rear housing portion having a connector for electrically connecting to a connector end of a wire harness of the vehicle when said camera is disposed at the vehicle;

wherein said front housing portion is mated with said rear housing portion with said circuit board disposed therein;

wherein said rear housing portion comprises internal wall structure establishing internal wall surfaces of said rear housing portion;

wherein said connector of said rear housing portion comprises a multi-pin connector having terminals that electrically connect to circuitry at said circuit board;

wherein said circuit board comprises a header connector that electrically connects with said terminals of said multi-pin connector;

an electrically conductive metallic shield element disposed within said rear housing portion and corresponding with said internal wall surfaces of said rear housing portion; and wherein said shield element includes a clamping element that receives said header connector therein, and wherein said clamping element comprises flexible walls that are biased towards a position where said flexible walls engage and clamp onto said header connector of said circuit board.

16. The camera of claim 15, wherein said circuit board is attached at said rear housing portion so as to hold said terminals of said multi-pin connector engaged with circuitry of said circuit board.

17. The camera of claim 16, wherein said circuit board is attached at said rear housing portion via at least one fastener, and wherein said shield element comprises a portion that engages the fastener and a ground element of said circuit board.

18. A camera for a vision system of a vehicle, said camera comprising:

a front housing portion comprising a lens;

a circuit board having circuitry established thereat, wherein said circuitry is associated with an imager of said camera;

a plastic rear housing portion having a connector for electrically connecting to a connector end of a wire harness of the vehicle when said camera is disposed at the vehicle;

wherein said front housing portion is mated with said rear housing portion with said circuit board disposed therein;

wherein said rear housing portion comprises internal wall structure establishing internal wall surfaces of said rear housing portion;

wherein said connector of said rear housing portion comprises a multi-pin connector having terminals that electrically connect to circuitry at said circuit board, and wherein said terminals of said multi-pin connector comprise a video signal terminal and at least one ground-connect terminal;

an electrically conductive metallic shield element disposed within said rear housing portion and corresponding with said internal wall surfaces of said rear housing portion; and wherein said shield element includes a clamping element in electrically conductive connection with said at least one ground-connect terminal and electrically isolated from said video signal terminal, and wherein said clamping element is press fit attached to said at least one ground-connect terminal.

19. The camera of claim 18, wherein said circuit board comprises a header connector that electrically connects with said terminals of said multi-pin connector, and wherein said clamping element comprises a plurality of flexible walls that are biased towards a position where said flexible walls engage and clamp onto said header connector of said circuit board.

20. The camera of claim 18, wherein said circuit board is attached at said rear housing portion so as to hold said terminals of said multi-pin connector engaged with circuitry of said circuit board, and wherein said circuit board is attached at said rear housing portion via at least one fastener, and wherein said shield element comprises a portion that engages the fastener and a ground element of said circuit board.

* * * * *